United States Patent
Lueschow et al.

(10) Patent No.: US 6,839,638 B2
(45) Date of Patent: Jan. 4, 2005

(54) PAYLOAD MONITOR HAVING DISTRIBUTION COEFFICIENT

(75) Inventors: Kevin J. Lueschow, Elmwood, IL (US); Giles K. Sorrells, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/305,410

(22) Filed: Nov. 26, 2002

(65) Prior Publication Data

US 2004/0102907 A1 May 27, 2004

(51) Int. Cl.⁷ .............................. G01B 3/00; G01B 5/00
(52) U.S. Cl. ..................................................... 702/33
(58) Field of Search .............................. 702/33, 87, 88, 702/101, 173–175; 73/1.13; 701/50, 69; 177/136, 140, 141

(56) References Cited

U.S. PATENT DOCUMENTS

| | | | |
|---|---|---|---|
| 4,635,739 A | * | 1/1987 | Foley et al. .................. 177/45 |
| 4,835,719 A | * | 5/1989 | Sorrells ....................... 702/174 |
| 4,921,578 A | | 5/1990 | Shiraishi et al. |
| 4,981,186 A | * | 1/1991 | Shankle et al. .............. 177/141 |
| 5,509,293 A | | 4/1996 | Karunmanchi |
| 6,052,925 A | | 4/2000 | Reiners |
| 6,150,617 A | | 11/2000 | Hart et al. |
| 2003/0220729 A1 | * | 11/2003 | Doddek et al. ............... 701/50 |

* cited by examiner

*Primary Examiner*—Michael Nghiem
(74) *Attorney, Agent, or Firm*—Tom Derry; Steven D Lundquist; Finnegan, Henderson, Farabow, Garrett & Dunne

(57) ABSTRACT

A method and apparatus is provided for calibrating a payload monitor of a work machine. Altering the load carrying body of a work machine can adversely impact the accuracy of a payload monitor. The present invention provides a calibrating technique using an alternate coefficient that is programmed into the payload monitor. The alternate coefficient is then used by the payload monitor.

23 Claims, 3 Drawing Sheets

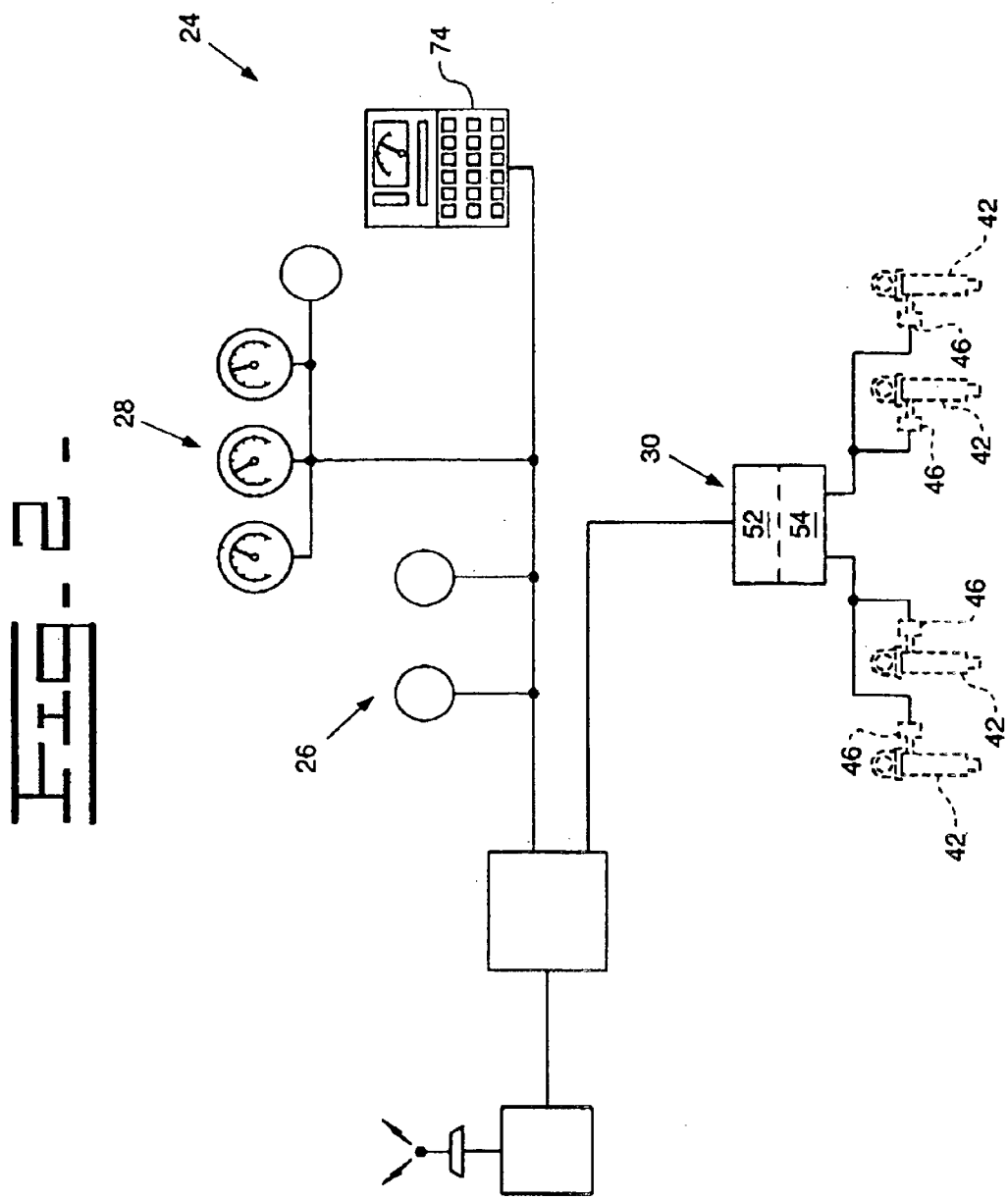

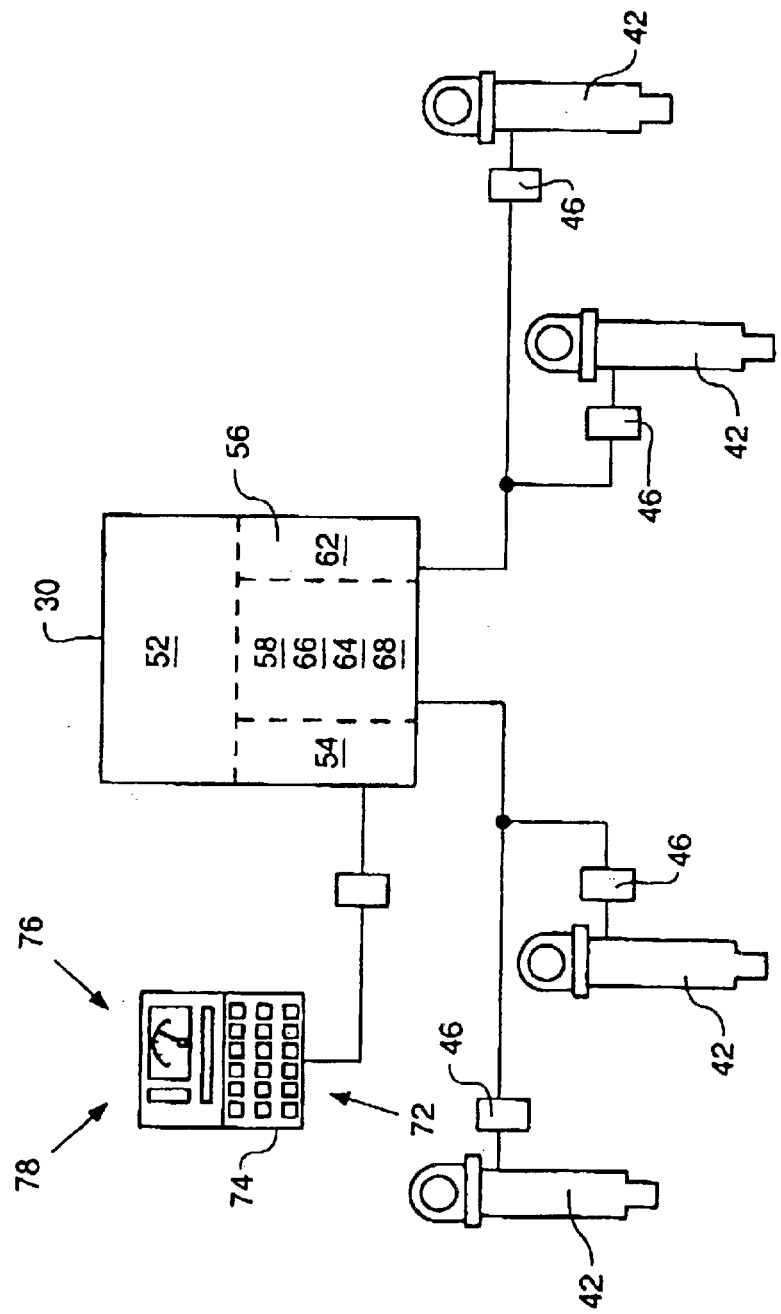

PAYLOAD MONITOR HAVING DISTRIBUTION COEFFICIENT

TECHNICAL FIELD

This invention relates generally to a work machine, and more specifically to a method and apparatus for calibrating a payload monitor used on the machine.

BACKGROUND

Work machines, such as earth moving trucks, wheel loaders and the like, often utilize a payload monitor to determine how much material is being moved by the machine. Information from the payload monitor may be used to ensure proper loading of the machine, monitor production rates of a machine and numerous other benefits.

U.S. Pat. No. 4,835,719 assigned to Caterpillar Inc. of Peoria, Ill. describes a method for monitoring payload. A plurality of pressure transducers provide data to a microprocessor. The microprocessor calculates the payload based on data received from the transducers. In performing the calculation the processor assumes that the center of gravity of the payload is positioned a predetermined distance between the front and rear axles of the machine. Typically, large trucks were assumed to distribute seventy five percent of the payload on the rear axle and twenty five percent of the weight on the front axle. Actual distribution of the load is in part dependent on the shape of the body or bucket that the load is being carried in.

The owners of these machines occasionally replace original bodies or buckets with custom bodies that are designed for a specific purpose. Often these custom bodies shift the center of gravity of the payload. A shift of even a percent or two in either direction may affect the accuracy of the calculated payload to a larger degree. Having an inaccurate payload system may cause overloading or under loading of the machine. Overloading of the machine could cause damage to the machine, while under loading reduces productivity.

It is desirable to have a payload monitor that can be adjusted to compensate for changes to the machine.

SUMMARY OF THE INVENTION

In one embodiment of the present invention a payload monitor is adapted to provide data related to the payload of a work machine. The payload monitor includes at least one sensor adapted to transmit a signal related to the load. A processor is adapted to receive the sensor signal and calculate payload. An alternate coefficient is input into the processor and alters the calculation, compensating for the accuracy of the payload monitor.

In another embodiment of the present invention a work machine having a frame is adapted to receive a payload. A powertrain is provided to move said machine and payload about the ground. A payload monitor provides data related to the weight of the payload on the machine. The payload monitor is configured to be calibrated in relation to said accuracy of said data.

In another embodiment of the present invention a method for calibrating a payload monitor is provided. The method includes the steps of carrying at least one load of material on a work machine. Determining the actual weight and distribution of the payload. Calculating the weight of the payload using said payload monitor. Comparing the actual weight to the calculated weight, inputting an alternate coefficient into the payload monitor.

BRIEF DESCRIPTION OF THE DRAWINGS

FIG. 2 is a schematic representation of a control system and payload monitor as employed in the present invention.

FIG. 3 is a detailed schematic representation of the payload monitor of the present invention.

DETAILED DESCRIPTION

Figure 1:
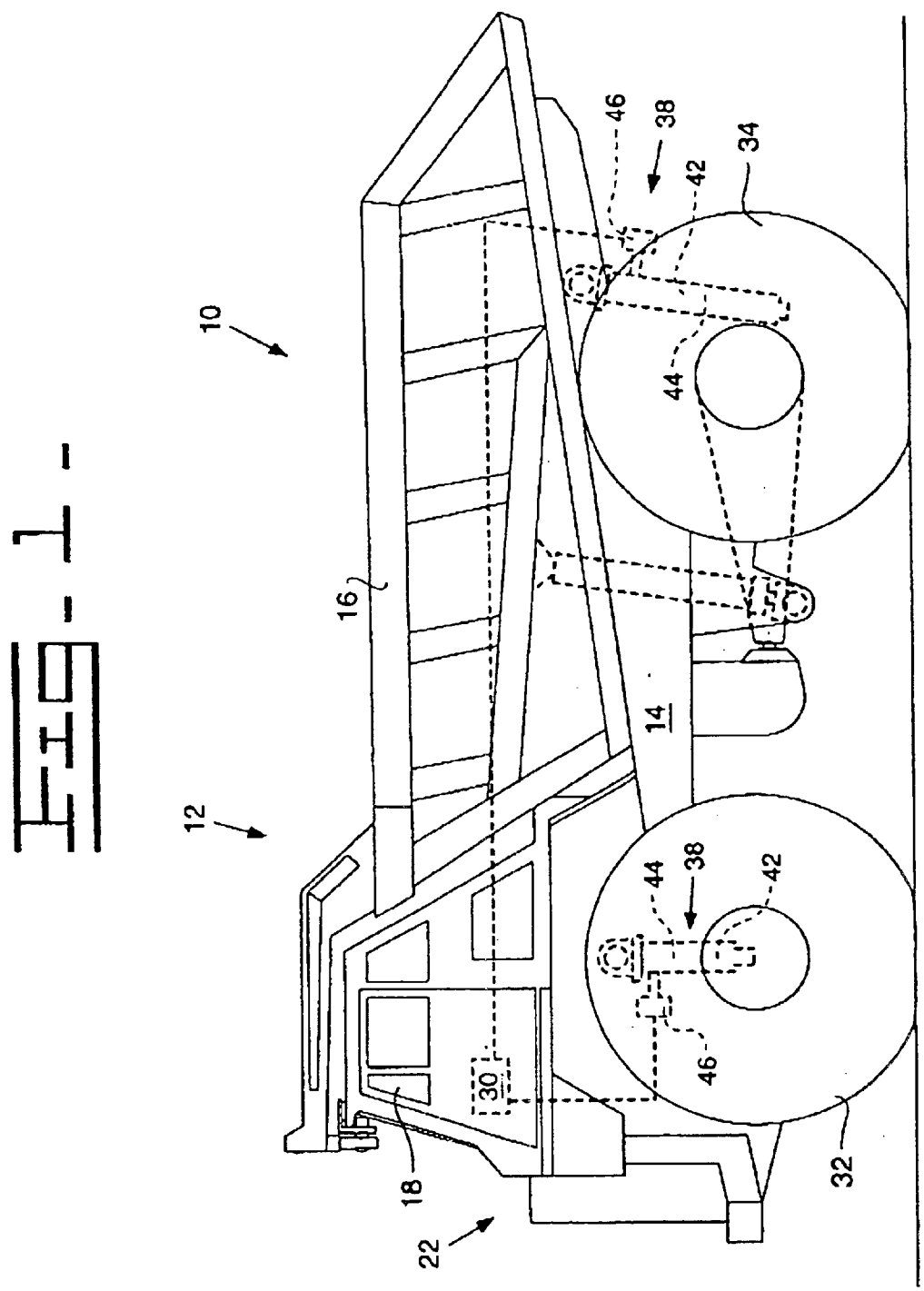
FIG. 1 is an elevational illustration of an off-highway truck employing the present invention.

In FIG. 1, a work machine 10 employing the present invention is shown. As illustrated the work machine 10 is an off-highway dump truck 12. It should be noted that the present invention can be adapted to be used on numerous other types of work machines, such as loaders and on-highway trucks. The truck 12 includes a frame 14 and a dump body 16 pivotally mounted to the frame 14. An operator cab 18 is mounted on the front of the frame 14 above an engine enclosure 22. The truck 12 includes a control system 24 (shown in FIG. 2) having a plurality of inputs 26 and displays 28. Additionally, a payload monitor 30 is provided and is in electrical communication with the control system 24. The truck 12 is supported on the ground by a pair of front wheels and tires 32 (one shown), and a pair of driven rear wheels and tires 34 (one shown). The wheels and tires 32, 34 are rotatably driven by front and rear axles (not shown) in a typical fashion. As is well known in the art, one or more engines (not shown) are housed within the engine enclosure 22. The engine is used to provide power to a final drive assembly 36 (not shown), via a mechanical or electric drive train.

A suspension system 38 is positioned between the axles and frame 14, to dampen movement of the truck 12 as it travels over rough terrain. The suspension system 38 includes four struts 42. One strut 42 is positioned near each wheel 32, 34. The struts 42 are similar to those used in automotive applications, although designed to operate under much higher loading conditions. The strut 42 includes a cavity 44 having oil and gas contained therein. The cavity 44 of each strut 42 is fluidly connected to a pressure transducer 46. As the strut 42 is compressed by the weight of the load on the machine 10, the gas becomes compressed, thereby increasing the pressure in the cavity 44.

Referring now to FIGS. 2 and 3, each of the pressure transducers 46 is electrically connected to the payload monitor 30. In one form of a payload monitor 30 the pressure transducer 46 is adapted transmit a signal related to the pressure in the cavity 44. The payload monitor 30 includes a microprocessor 52 and a memory portion 54, and is adapted to calculate the weight and distribution of the load (payload) on the work machine 10. The memory portion 54 includes a configuration file 56 and battery backed up memory 58. The configuration file 56 is a non-volatile (permanent) file, while the battery backed up memory 58 is erased if power is lost. A payload calculation 62 is performed by the microprocessor 52 using pressure signals from each of the pressure transducers 46. The calculation 62 is stored in the configuration file 56 and is shown below;

$$\text{payload} = C_F * \Sigma \text{pressure}_f + C_R * \Sigma \text{pressure}_r + FF$$

$C_F$ represents a front coefficient related to percent of weight distribution on the front axle. $\Sigma \text{pressure}_f$ represents the sum of the pressure signals from the front struts. $C_R$ represents a rear coefficient related to distribution of payload on the rear axle. $\Sigma \text{pessure}_r$ represents the sum of pressure signals from the rear struts. FF represent the total resistance to movement of the struts 42 caused by friction.

To adjust for payload distribution anomalies, an alternate coefficient 64 may be stored in the battery backed up memory 58. The alternate coefficients 64 may be an override coefficient 66 or may be an adjustment coefficient 68. If the alternate coefficient 64 is in the battery backed up memory 58, the payload monitor 30 calculates payload using the alternate coefficient 64. An example of an override coefficient 66 includes storing a new value in the battery backed up memory 58, such as $C_F=0.22$. The microprocessor 52 then substitutes the override coefficient 66 for the original front coefficient. An example of a adjustment coefficients 68 may include the following sequence. The typical calculation 62 is programmed into the configuration file 56 using 0.25 and 0.75 for CF and $C_R$ respectively. The dump body 16 has been determined to possess characteristics that in actuality distribute the payload at 78% on the rear axle and 22% on the front axle. It may then be determined that $C_F=0.25*0.88=0.22$ and $C_R=0.75*1.04=0.78$. Therefore a first adjustment coefficient of 0.88 is multiplied by $C_F$ and $C_R$ is multiplied by a second adjustment coefficient of 1.04. It should be noted that numerous other mathematical methods may be used to adjust for payload distribution.

The alternate coefficient 64 may be programmed into the payload monitor 30 through a programming device 72. One example of a programming device 72 is a keypad 74 electronically coupled to the control system 24. The programming device 72 may be used to access the battery backed up memory 58. A predetermined series of keystrokes would input the desired alternate coefficient 64, while another key may enable or disable the processor 52 to use the alternate coefficient 64. Alternatively, a portable data assistant may be used to input the alternate coefficient 64. Examples of a portable data assistant include a laptop 76 or handheld computer 78.

The present invention may be adapted to be used with other types of payload monitors 30. Other types of payload monitors 30 may position sensors between the frame 14 and the dump body 16 to provide sensor data, or may measure some other load point.

INDUSTRIAL APPLICABILITY

In operation, the present invention provides a method and apparatus for calibrating a payload monitor 30 on a work machine 10. The accuracy of the payload monitor 30 is first determined through a series of load studies. A load study determines the actual weight of the payload on the machine 10 using a stationary or portable scale. The scale must be capable of accurately measuring the distribution between the front and rear axles. Simultaneously, the weight provided from the payload monitor 30 is calculated and recorded. Typical payload monitors 30 include features to store payload data or transmit the data to a remote office. Upon comparing actual payload to calculated payload and distribution, the accuracy of the payload monitor 30 can be determined. Depending upon the comparison an alternate coefficient 64 may be determined and programmed into the payload monitor 30. Statistical methodology may be used to determine the number of payload studies required and the proper alternate coefficient.

What is claimed is:

1. A payload monitor adapted to provide data related to the payload of a work machine, said payload monitor comprising:

at least one sensor adapted to transmit a sensor signal related to the load being carried by said work machine;

a processor adapted to receive said sensor signal and perform a calculation, which includes applying a first coefficient to the sensor signal, to determine the payload of said work machine, and to perform the calculation with an alternate coefficient that is used to modify the first coefficient;

wherein said first coefficient and said alternate coefficient are used in said calculation to account for distribution of payload between a front and a rear axle.

2. The payload monitor of claim 1, wherein said alternate coefficient is input into said processor using a programming device.

3. The payload monitor of claim 2, wherein said programming device is a keypad.

4. The payload monitor of claim 2, wherein said programming device is a laptop computer.

5. The payload monitor of claim 2, wherein said programming device is a handheld computer.

6. The payload monitor of claim 1, wherein said alternate coefficient is determined using at least one load study.

7. A work machine for use to move material, said work machine comprising:

a frame;

a dump body adapted to receive a payload;

at least one sensor adapted to transmit a sensor signal related to the load being carried by said work machine; and a payload monitor adapted to provide data related to the weight of the payload on the machine;

wherein said payload monitor is configured to;

perform a calculation, which includes applying a first coefficient to the sensor signal, to determine the payload of said work machine; and perform the calculation with an alternate coefficient that is used to modify the first coefficient;

wherein said first coefficient and said alternate coefficient are used in said calculation to account for distribution of payload between a front and a rear axle.

8. The work machine of claim 7, wherein said alternate coefficient is input into a processor.

9. The work machine of claim 8, wherein said alternate coefficient is input into said processor using a programming device.

10. The work machine of claim 9, wherein said programming device is a keypad.

11. The work machine of claim 9, wherein said programming device is a laptop computer.

12. The work machine of claim 9, wherein said programming device is a handheld computer.

13. The work machine of claim 7, wherein said alternate coefficient is determined by providing at least one load study.

14. A method for calibrating a payload monitor adapted to calculate the weight of a payload being carried by a work machine, said method comprising the steps of:

determining an actual weight of said payload being carried by said machine, calculating the weight of said payload using a first coefficient related to a distribution of the payload on the work machine, comparing the actual weight of said payload to the calculated weight of said payload; and determining an alternate coefficient to compensate for the difference between the actual weight and calculated weight of the payload, inputting said alternate coefficient into said payload monitor.

15. The method of claim 14 including the step of using a keypad to input said alternate coefficient into said payload monitor.

16. The method of claim 14 including the step of using a laptop computer to input said alternate coefficient into said payload monitor.

17. The method of claim 14 including the step of using a handheld computer to input said alternate coefficient into said payload monitor.

18. The method of claim 14 including the step of substituting the alternate coefficient for the first coefficient.

19. The method of claim 14, including the step of adjusting the first coefficient by applying the alternate coefficient to the first coefficient using a mathematical operation.

20. A payload monitor adapted to provide data related to the payload of a work machine, said payload monitor comprising:

a first sensor adapted to transmit a first sensor signal related to a load being carried by a front portion of said work machine;

a second sensor adapted to transmit a second sensor signal related to a load being carried by a rear portion of said work machine;

a processor adapted to receive said sensor signals and perform a calculation, which includes applying a first coefficient to the first sensor signal, to determine the load being carried by the front portion of said work machine, and applying a second coefficient to the second sensor signal, to determine the load being carried by the rear portion of said work machine, and to perform the calculation with an alternate coefficient that is used to modify at least one of the first and second coefficients.

21. The payload monitor of claim 20, wherein the processor is configured to modify the at least one of the first and second coefficients with the alternate coefficient by using a mathematical operation.

22. The payload monitor of claim 20, wherein the processor is configured to substitute the alternate coefficient for the at least one of the first and second coefficients.

23. The payload monitor of claim 20, wherein the processor is configured to perform the calculation with the alternate coefficient modifying the first coefficient and another alternate coefficient modifying the second coefficient.

\* \* \* \* \*